United States Patent
Hamano

[11] Patent Number: 5,751,496
[45] Date of Patent: May 12, 1998

[54] ZOOM LENS OF REAR FOCUS TYPE

[75] Inventor: Hiroyuki Hamano, Kanagawa-ken, Japan

[73] Assignee: Canon Kabushiki Kaisha, Tokyo, Japan

[21] Appl. No.: 653,197

[22] Filed: May 24, 1996

[30] Foreign Application Priority Data

May 30, 1995 [JP] Japan ................ 7-131813

[51] Int. Cl.$^6$ ................ G02B 15/14
[52] U.S. Cl. ........ 359/677; 359/683; 359/684; 359/685; 359/740
[58] Field of Search ............... 359/684, 685, 359/677, 676, 640, 683

[56] References Cited

U.S. PATENT DOCUMENTS

| | | | |
|---|---|---|---|
| 4,789,229 | 12/1988 | Yamanashi | 359/685 |
| 4,988,174 | 1/1991 | Horiuchi et al. | 350/427 |
| 5,050,972 | 9/1991 | Mukaiya et al. | 359/683 |
| 5,134,524 | 7/1992 | Hamano et al. | 359/687 |
| 5,138,492 | 8/1992 | Hamano et al. | 359/684 |
| 5,202,992 | 4/1993 | Banno et al. | 359/684 |
| 5,231,540 | 7/1993 | Shibata | 359/684 |
| 5,296,969 | 3/1994 | Mihara | 359/684 |
| 5,299,064 | 3/1994 | Hamano et al. | 359/684 |
| 5,341,243 | 8/1994 | Okuyama et al. | 359/684 |
| 5,363,242 | 11/1994 | Yokota | 359/684 |
| 5,430,576 | 7/1995 | Hamano | 359/684 |
| 5,537,255 | 7/1996 | Tochigi | 359/684 |
| 5,546,230 | 8/1996 | Sato et al. | 359/684 |
| 5,548,445 | 8/1996 | Yahagi | 359/684 |
| 5,583,699 | 12/1996 | Nakayama | 359/684 |

FOREIGN PATENT DOCUMENTS

| | | |
|---|---|---|
| 62-24213 | 2/1987 | Japan . |
| 62-247316 | 10/1987 | Japan . |
| 4-43311 | 2/1992 | Japan . |
| 4-301612 | 10/1992 | Japan . |

*Primary Examiner*—Georgia Y. Epps
*Assistant Examiner*—Evelyn A. Lester
*Attorney, Agent, or Firm*—Fitzpatrick, Cella, Harper & Scinto

[57] ABSTRACT

A zoom lens of the rear focus type is disclosed, comprising, in order from an object side to an image side, a first lens unit of positive refractive power, a second lens unit of negative refractive power, a third lens unit of positive refractive power, a fourth lens unit of positive refractive power and a fifth lens unit of negative refractive power, wherein at least the second lens unit and the fourth lens unit are moved to vary magnification and the fourth lens unit is moved to effect focusing, and wherein the third lens unit comprises, in order from the object side to the image side, a positive lens and a negative lens having a strong concave surface facing the image side.

2 Claims, 7 Drawing Sheets

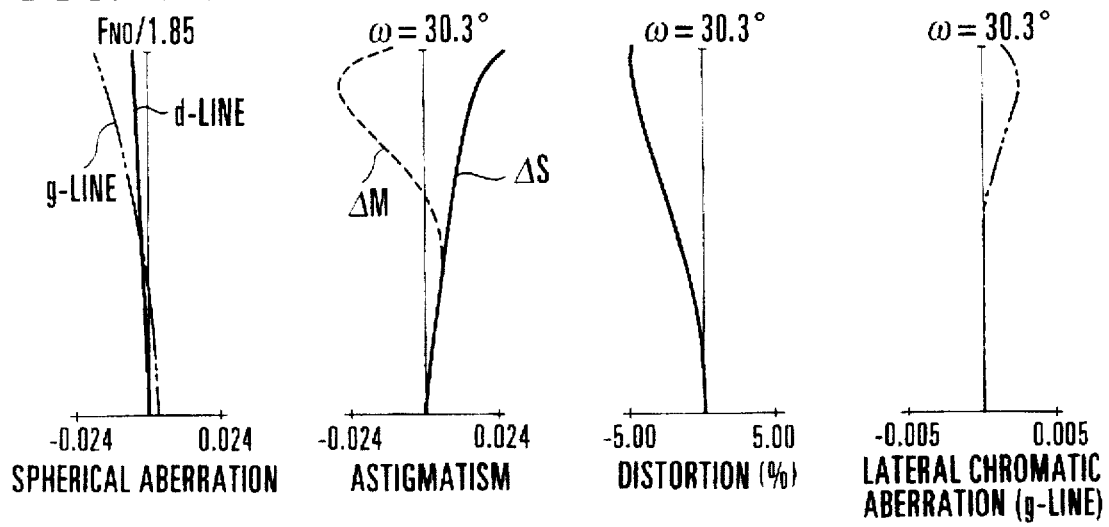
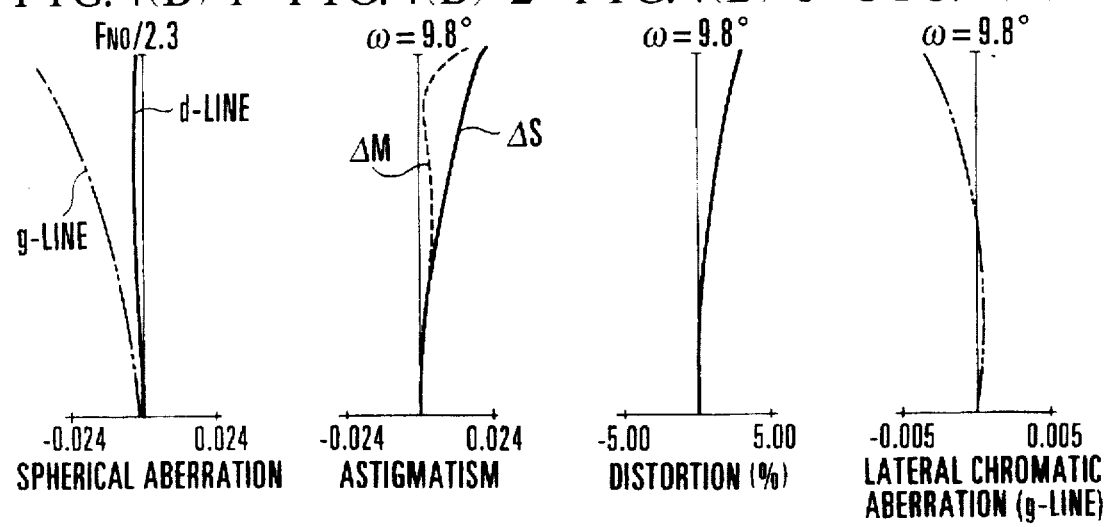
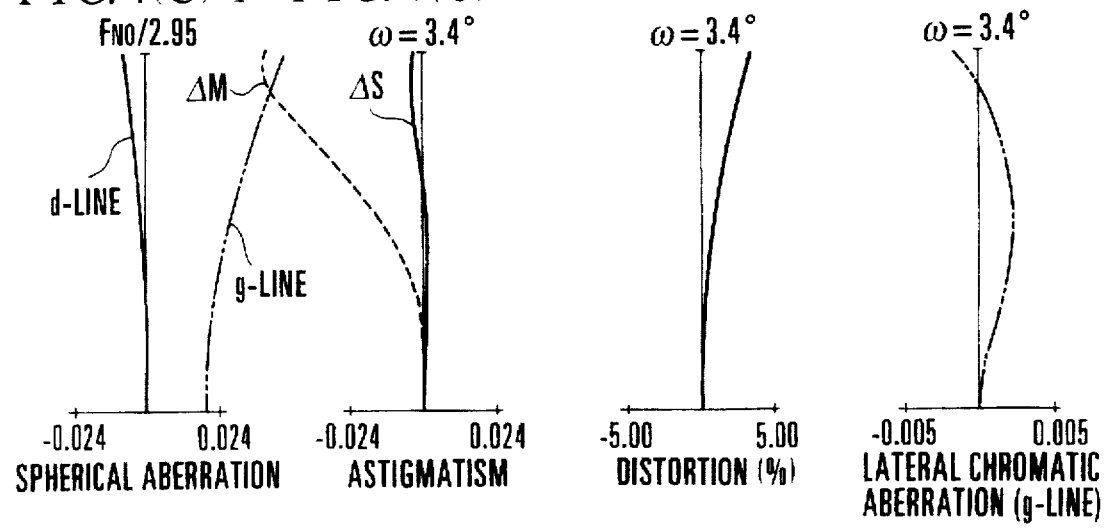

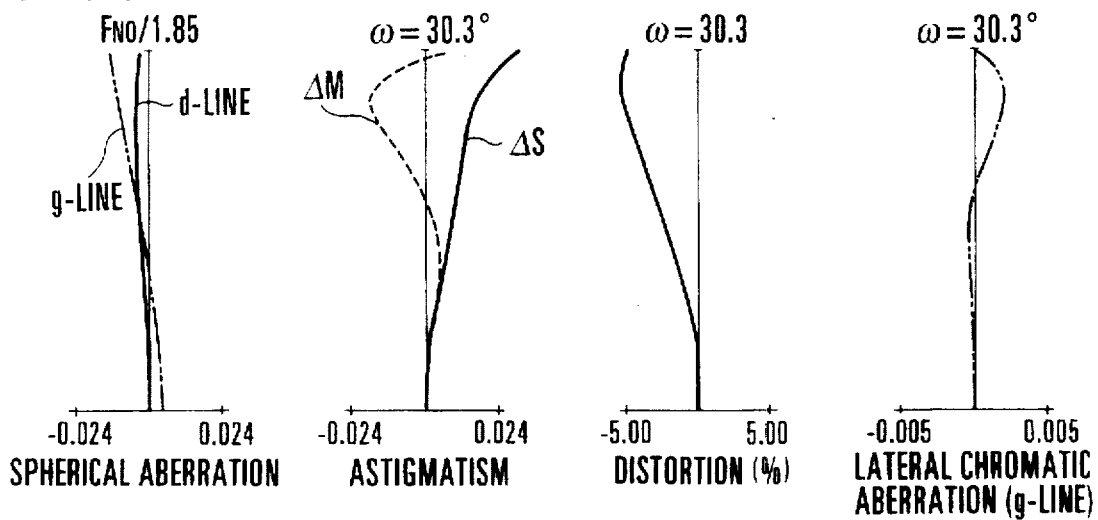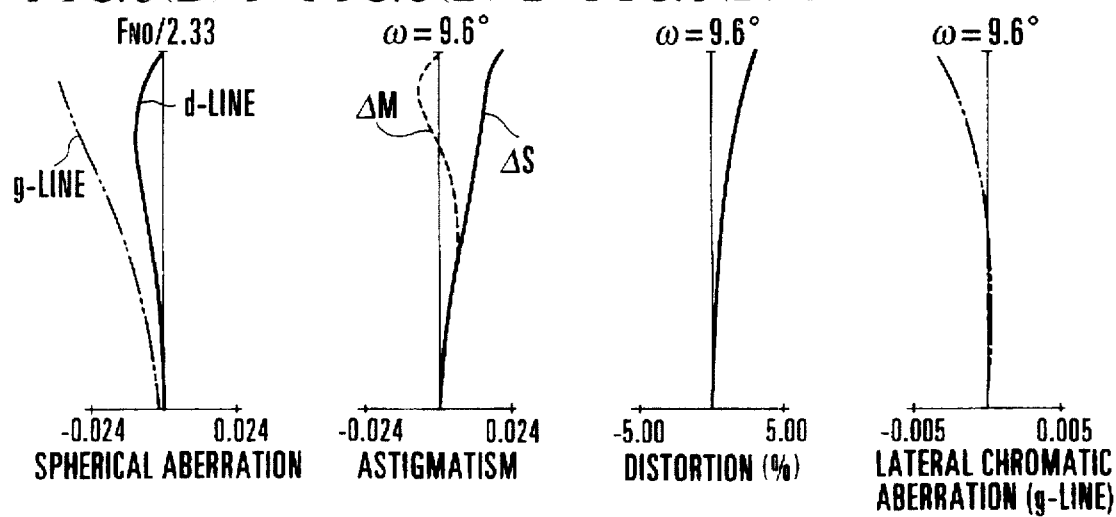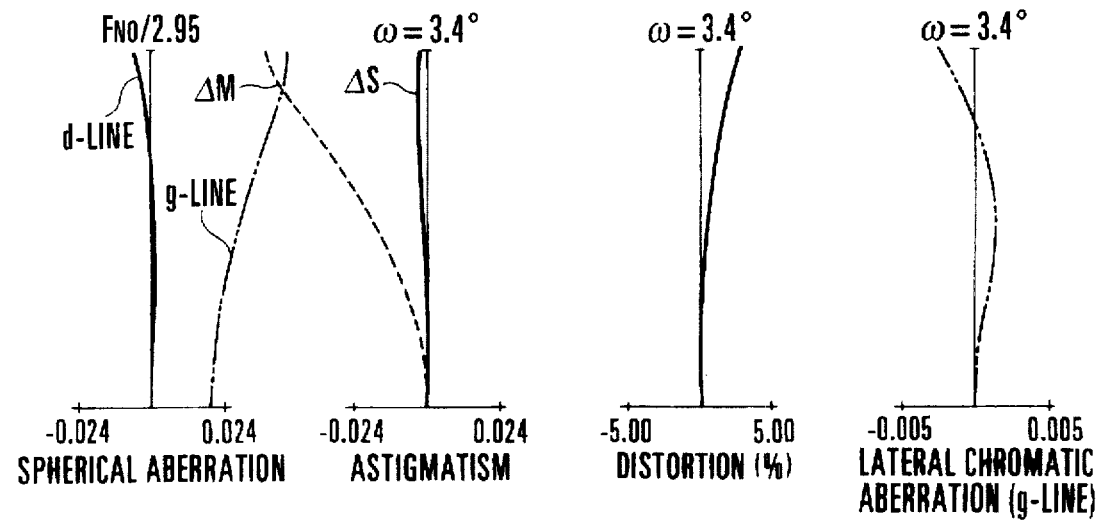

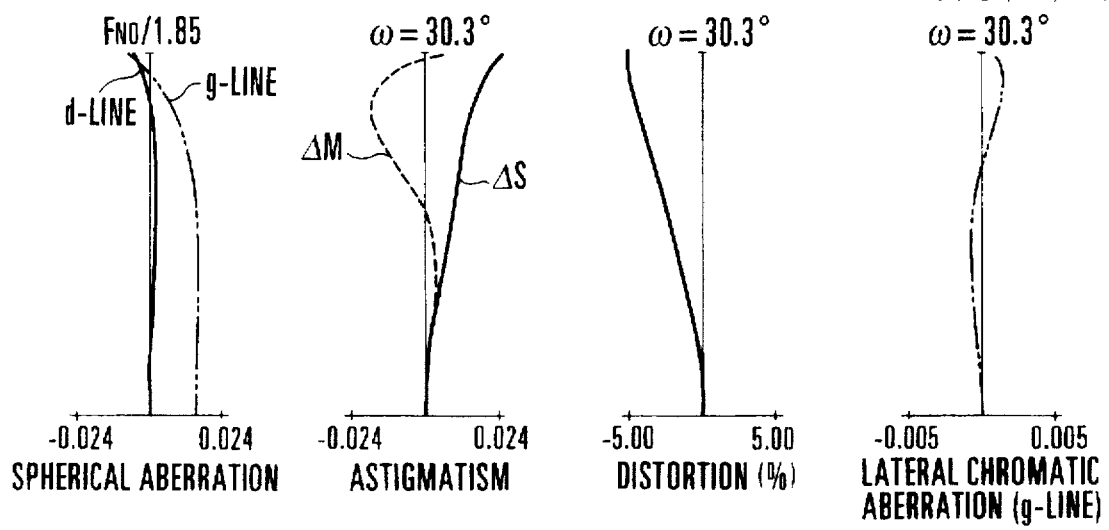
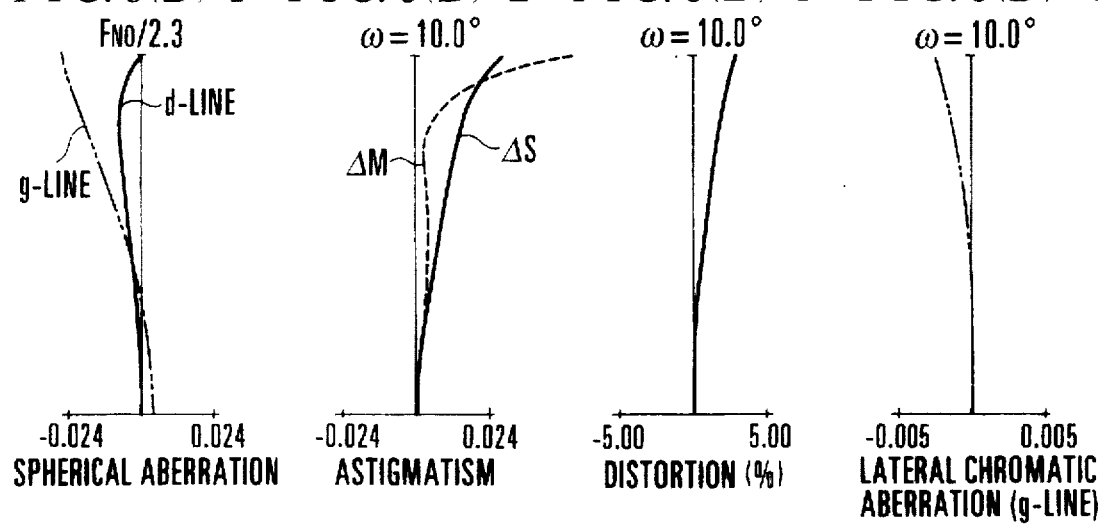
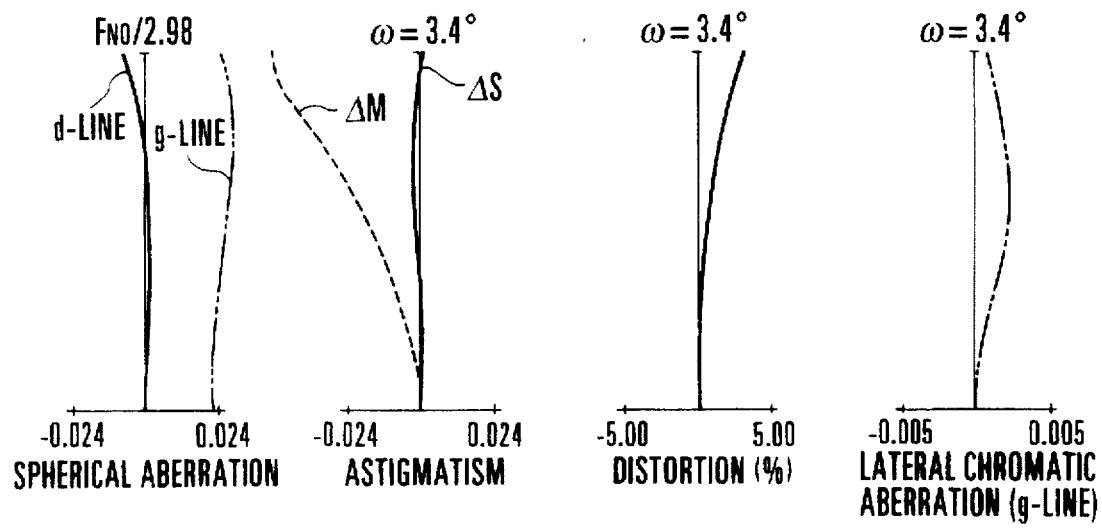

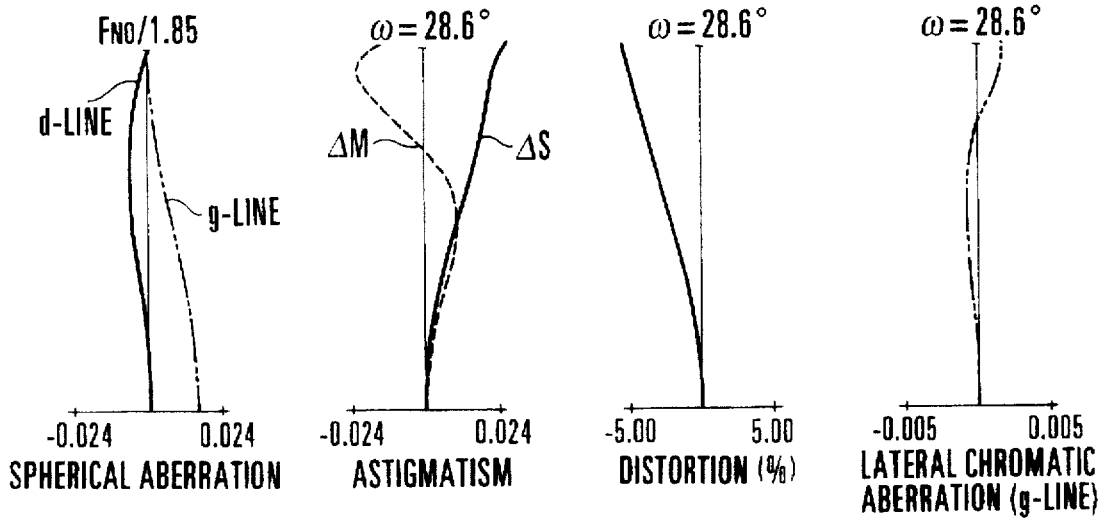
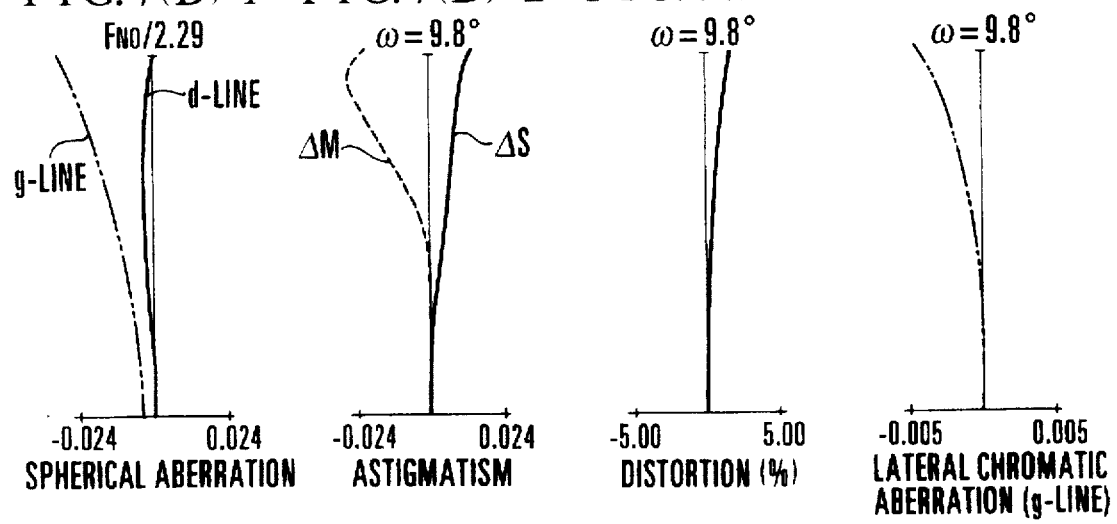
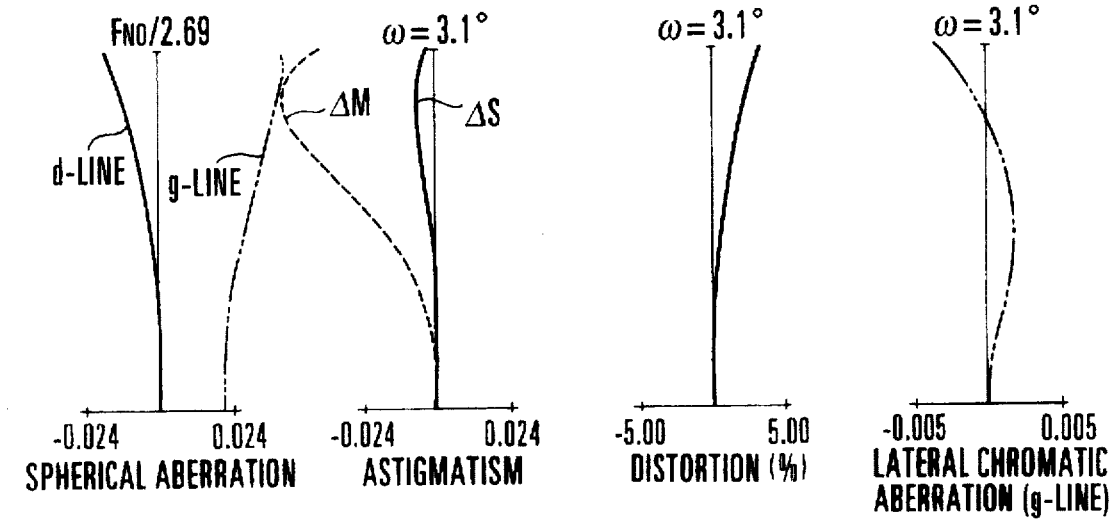

ZOOM LENS OF REAR FOCUS TYPE

BACKGROUND OF THE INVENTION

1. Field of the Invention

This invention relates to zoom lenses having as high a range as about 10 in the variable magnification ratio and as large a relative aperture as about 1.8 in F-number with the bulk and size minimized to a compact form, while still maintaining a good stability of optical performance, which are suited to be used particularly in video cameras or photographic cameras.

2. Description of the Related Art

For use in photographic cameras or video cameras, there have been many previous proposals for zoom lenses of a type in which a lens unit other than the front or first lens unit is made movable to effect focusing, i.e., of the so-called "rear focus" type.

In general, as compared with a zoom lens whose first lens unit is moved to effect focusing, a zoom lens of the rear focus type has such advantages that the effective diameter of the first lens unit becomes smaller so as to easily improve the compact form of the entire lens system, that a close-up photography, particularly, a supershort focusing, can be performed with ease, and further that, since a lens unit to be used for focusing is smaller in size and lighter in weight, a weaker driving torque suffices for moving the lens unit and a rapid focus adjustment, therefore, can be performed.

Such a zoom lens of the rear focus type is disclosed in, for example, Japanese Laid-Open Patent Application No. Sho 62-247316, in which the zoom lens comprises, in order from an object side, a first lens unit of positive refractive power, a second lens unit of negative refractive power, a third lens unit of positive refractive power and a fourth lens unit of positive refractive power, totalling four lens units, the second lens unit is moved to vary magnification, and the fourth lens unit is moved to compensate for the image shift caused by the variation of magnification and to effect focusing.

In Japanese Laid-Open Patent Application No. Hei 4-43311, a zoom lens comprises, in order from an object side, a first lens unit of positive refractive power, a second lens unit of negative refractive power, a third lens unit of positive refractive power and a fourth lens unit of positive refractive power, wherein the third lens unit is constructed with a positive lens and a negative lens in the form of the telephoto type, thus shortening the overall length of the third and fourth lens units.

In another Japanese Laid-Open Patent Application No. Hei 4-301612, a zoom lens comprises, in order from an object side, a first lens unit of positive refractive power, a second lens unit of negative refractive power, a third lens unit of positive refractive power, a fourth lens unit of positive refractive power and a fifth lens unit of negative refractive power, the second and fourth lens units being moved to vary magnification and the fourth lens unit being moved to effect focusing, wherein the overall length of the third, fourth and fifth lens units is shortened owing to the use of the negative fifth lens unit.

In most cases, the use of the rear focus type in the zoom lens produces the outstanding advantages described above. That is, the entirety of the lens system is minimized in bulk and size. Rapid focusing becomes possible. Further, a close-up photography becomes easier to do.

Concerning a zoom lens comprising, in order from an object side, a first lens unit of positive refractive power, a second lens unit of negative refractive power, a third lens unit of positive refractive power and a fourth lens unit of positive refractive power, if it is attempted to shorten the overall length of the third and fourth lens units by increasing a refractive power of the third lens unit, the amount of movement of the fourth lens unit during focusing or during variation of magnification becomes too large. For an object at the minimum distance, therefore, a problem arose in that, as zooming to the intermediate region of focal lengths, the third and fourth lens units mechanically interfere with each other. Thus, the air separation between the third and fourth lens units has to be widened greatly, and the total length is caused to become rather longer.

The zoom lens disclosed in Japanese Laid-Open Patent Application No. Hei 4-301612 is a 5-unit one in which a stationary negative lens is additionally provided on the image side of the four lens units. In this case, the third to fourth lens units are formed to the telephoto type, thereby shortening the total length of the entire lens system. However, because an aperture stop is located in between the second and third lens units, it is necessary to excessively widen the space where a light beam strongly diverges behind the second lens unit.

Also, this arrangement leads to an increase in the variation of aberrations during variation of magnification or during focusing. It is, therefore, very difficult to simultaneously fulfill the requirements of achieving improvements of the compact form and of maintaining a good stability of high optical performance throughout.

SUMMARY OF THE INVENTION

The invention employs the rear focusing method and is to greatly increase the relative aperture and the zooming range at once. An object of the invention is, therefore, to provide a zoom lens of the rear focus type with the total length of the entire system shortened to improve the compact form, while still permitting a good stability of optical performance to be maintained at a high level throughout the entire zooming range and throughout the entire focusing range.

A zoom lens according to the invention comprises, in order from an object side to an image side, a first lens unit having a positive refractive power, a second lens unit having a negative refractive power, a third lens unit having a positive refractive power, a fourth lens unit having a positive refractive power and a fifth lens unit having a negative refractive power, wherein at least the second and fourth lens units are moved to vary magnification and the fourth lens unit is moved to effect focusing, and wherein the third lens unit comprises, in order from the object side to the image side, a positive lens and a negative lens having a strong concave surface facing the image side.

These and other objects and features of the invention will become apparent from the following detailed description of preferred embodiments thereof taken by reference to the accompanying drawings:

BRIEF DESCRIPTION OF THE DRAWINGS

FIGS. 4(A)-1 to 4(A)-4, FIGS. 4(B)-1 to 4(B)-4 and FIGS. 4(C)-1 to 4(C)-4 are graphic representations of the aberrations of the zoom lens of the numerical example 1.

FIGS. 5(A)-1 to 5(A)-4, FIGS. 5(B)-1 to 5(B)-4 and FIGS. 5(C)-1 to 5(C)-4 are graphic representations of the aberrations of the zoom lens of the numerical example 2.

FIGS. 6(A)-1 to 6(A)-4, FIGS. 6(B)-1 to 6(B)-4 and FIGS. 6(C)-1 to 6(C)-4 are graphic representations of the aberrations of the zoom lens of the numerical example 3.

FIGS. 7(A)-1 to 7(A)-4, FIGS. 7(B)-1 to 7(B)-4 and FIGS. 7(C)-1 to 7(C)-4 are graphic representations of the aberrations of the zoom lens of the numerical example 4.

In the diagrams, I denotes the first lens unit, II denotes the second lens unit, III denotes the third lens unit, IV denotes the fourth lens unit, and V denotes the fifth lens unit.

In the graphs, ΔM stands for the meridional image focus, ΔS for the sagittal image focus, d for the spectral d-line, and g for the spectral g-line.

DETAILED DESCRIPTION OF THE PREFERRED EMBODIMENTS

Figure 1:
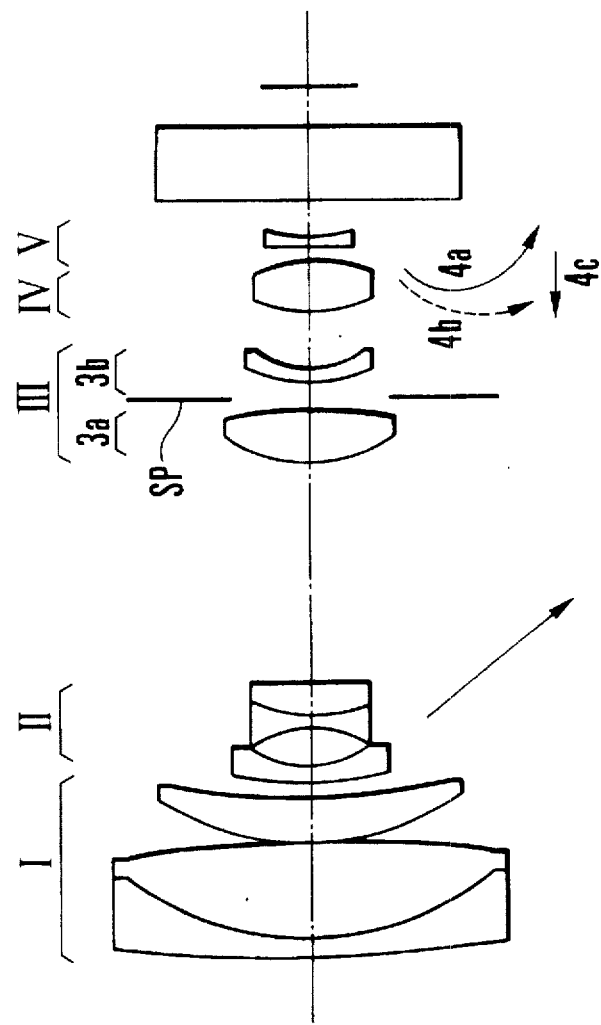
FIG. 1 is a lens block diagram of numerical examples 1 and 2 of the invention.
Figure 2:
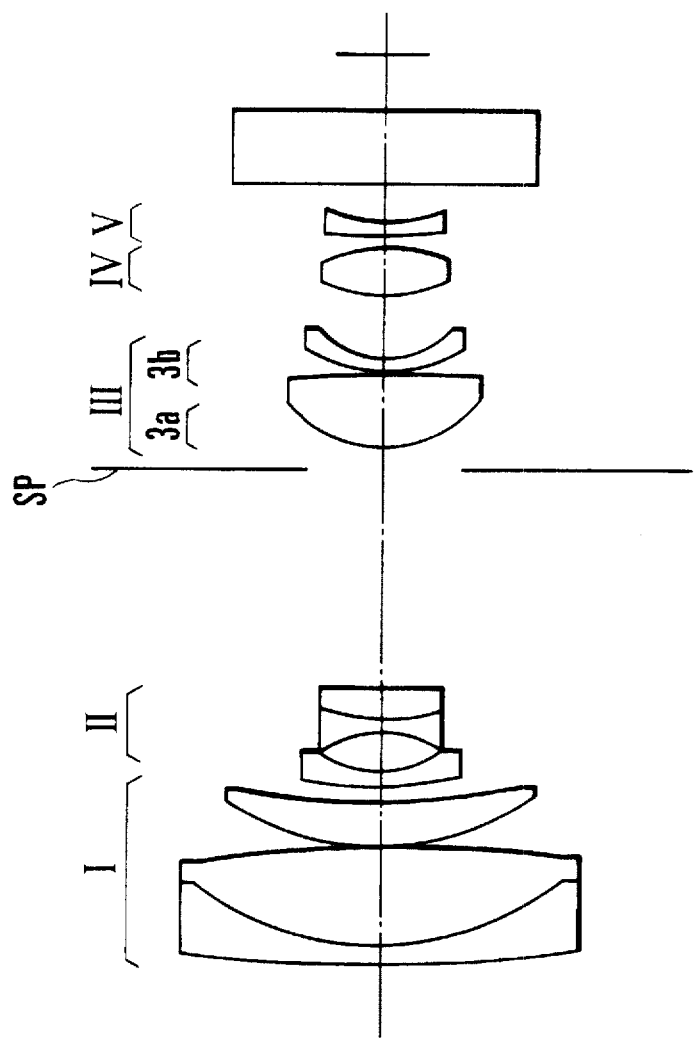
FIG. 2 is a lens block diagram of a numerical example 3 of the invention.
Figure 3:
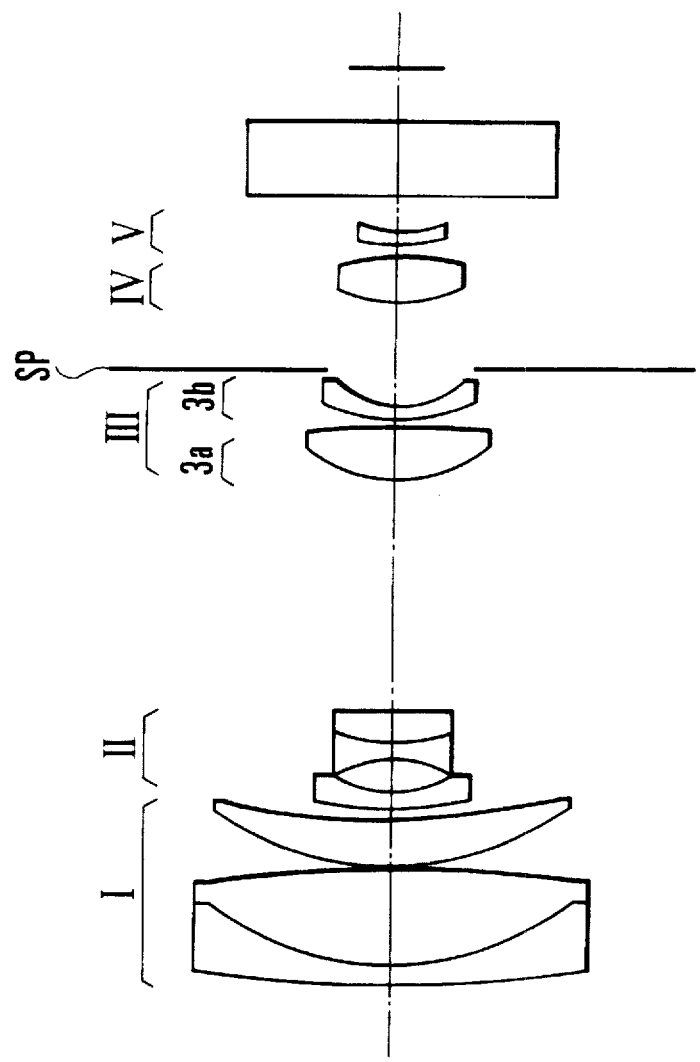
FIG. 3 is a lens block diagram of a numerical example 4 of the invention.

FIG. 1 is a longitudinal section view showing the numerical examples 1 and 2 of zoom lenses of the invention, in which Roman numeral I denotes the first lens unit of positive refractive power, Roman numeral II denotes the second lens unit of negative refractive power, Roman numeral III denotes the third lens unit of positive refractive power, Roman numeral IV denotes the fourth lens unit of positive refractive power and Roman numeral V denotes the fifth lens unit of negative refractive power. Of the graphic representations, the ones of each figure number with suffix (A), (B) or (C) show the aberrations in the wide-angle end, an intermediate focal length position, or the telephoto end, respectively.

The third lens unit comprises a lens 3a of positive refractive power and a lens 3b of negative refractive power. An aperture stop SP is located between the lenses 3a and 3b.

During variation of magnification from the wide-angle end to the telephoto end, at least the second lens unit is moved toward the image side as shown by the arrow, while the fourth lens unit is simultaneously moved to compensate for the shift of an image plane caused by the variation of magnification.

Further, the fourth lens unit is moved along an optical axis to effect focusing, as the rear focus type is employed. For an object at infinity, or the minimum distance, according to the variation of magnification from the wide-angle end to the telephoto end, the fourth lens unit is moved to compensate for the image shift along a locus shown by a solid line curve 4a, or a dashed line curve 4b, respectively, in FIG. 1.

It is to be noted that the first, third and fifth lens units remain stationary during variation of magnification and during focusing.

Further, it is to be noted that at least the first lens unit may be also moved in order to lessen the duty of varying magnification that the second lens unit bears.

In the present embodiment, it is the fourth lens unit that is given not only the function of compensating for the image shift with zooming but also the focusing function. In particular, as shown by the curves 4a and 4b in FIG. 1, the loci of motion of the fourth lens unit are made convex toward the object side during variation of magnification from the wide-angle end to the telephoto end. This assures efficient utilization of the air space between the third lens unit and the fourth lens unit, thus achieving a shortening of the total length of the entire lens system advantageously.

In the present embodiment, with the setting, for example, in the telephoto end, when focusing from an infinitely distant object to closer objects, the fourth lens unit is moved forward as shown by a straight line 4c in FIG. 1.

In the invention, the third lens unit is constructed with a lens of positive refractive power and a lens of negative refractive power. By providing a certain space between the two lenses, the third lens unit is formed to the telephoto type. This assures shortening of the overall length of the third to fifth lens units. In addition, for the counter part, the fourth lens unit is constructed in the form of only one positive lens. As this lens is sufficient to compensate for the image shift and to perform focusing, a range of movement of the fourth lens unit is minimized and, at the same time, an air separation between the third and fourth lens units is minimized, thereby making it possible to improve the compact form.

Another feature of the present embodiment is that the aperture stop is located in a space within the third lens unit at a point between the lens of positive refractive power and the lens of negative refractive power. This space not only gives the third lens unit the necessary telephoto ratio but also assures minimization of the separation between the second and third lens units, thereby making it possible to utilize the space efficiently and to attain the shortening of the total length of the entire zoom lens.

In particular, in order to increase the telephoto ratio of the third lens unit, the negative lens in the third lens unit is so formed as to have a stronger concave surface on the image side than on the object side.

Along with this, the third lens unit is made as much sufficient in the telephoto type as necessary to assure the shortening of the total length of the complete zoom lens. For this purpose, the positive lens in the third lens unit is made to satisfy the following condition:

$$0.45 < |f_{3a}/f_3| < 0.75 \tag{1}$$

where $f_{3a}$ is a focal length of the positive lens in the third lens unit, and $f_3$ is an overall focal length of the third lens unit.

When the lower limit of the condition (1) is exceeded, as this means that the refractive power of the positive lens is too strong, it is advantageous for shortening the total length of the complete zoom lens, but it becomes difficult to correct spherical aberration and coma in the neighborhood of the wide-angle end. Conversely, when the upper limit is exceeded, it becomes difficult to obtain the sufficient effect for shortening the total length of the complete zoom lens.

Also, in the present embodiment, to reduce the number of lens elements, an aspheric surface is introduced to any of the lens units, particularly, the third and fourth lens units.

Specifically, the positive lens in the third lens unit is constructed with one bi-convex lens element having an aspheric surface, and the negative lens in the third lens unit is constructed with one negative meniscus lens element having a strong concave surface facing the image side. The fourth lens unit is constructed with a single lens having at least one aspheric surface.

For the first lens unit, its negative lens is made up by using a glass material whose Abbe number $v_{1N}$ lies within the following range:

$$v_{1N} < 23 \tag{2}$$

When this condition is satisfied, the achromatic effect is enhanced to allow for reduction of the thicknesses of positive lenses of the first lens unit.

As the second lens unit is given a strong negative refractive power, the Petzval sum of the entire lens system is caused especially to be negative, taking a large value. For the second lens unit, therefore, at least one of its negative lenses is made up by using a glass material whose refractive index $N_{2N}$ falls within the following range:

$$N_{2N} > 1.85 \tag{3}$$

Further, in the present embodiment, a magnification $\beta_5$ for an infinitely distant object of the fifth lens unit is determined so as to satisfy the following condition:

$$1.2 < \beta_5 < 2.0 \tag{4}$$

The optical performance is thus preserved while shortening the total length of the complete zoom lens.

When the magnification of the fifth lens unit is smaller than the lower limit of the inequalities of condition (4), the effect of sufficiently shortening the total length of the complete zoom lens cannot be obtained.

Conversely, when the magnification is greater than the upper limit, this is favorable to the shortening of the total length of the complete zoom lens, but the Petzval sum increases in the negative sense so greatly that the field curvature becomes difficult to correct and that the telecentric nature considerably collapses. This is hardly suited to a video camera or the like.

To shorten the overall length of the third to fifth lens units, while still permitting the optical performance to be kept at a certain level, it is preferable to satisfy the following condition:

$$2.2 < f_3/f_w < 3.6 \tag{5}$$

where $f_3$ is a focal length of the third lens unit, and $f_w$ is a focal length in the wide-angle end of the entire zoom lens.

The inequalities of condition (5) give a proper range for the focal length of the third lens unit. When the lower limit is exceeded, as this means that the refractive power of the third lens unit is too strong, it is in some cases that insufficient correction of spherical aberration and coma results. In other cases, it becomes difficult to secure the back focal distance.

Conversely, when the upper limit is exceeded, an insufficient shortening of the total length of the complete zoom lens results.

In the present embodiment, to further shorten the overall length of the third to fifth lens units, the movement of the fourth lens unit is minimized. In this respect, it is preferable to satisfy the following condition:

$$1.2 < f_4/f_w < 2.2 \tag{6}$$

where $f_4$ is a focal length of the fourth lens unit.

The inequalities of condition (6) give a proper range for the focal length of the fourth lens unit. When the lower limit is exceeded, as this means that the refractive power of the fourth lens unit is too strong, a large variation of spherical aberration during variation of magnification results. Conversely, when the upper limit is exceeded, the movement of the fourth lens unit becomes too long so that a necessity arises to widen the air separation between the third and fourth lens units. Therefore, the sufficient effect of shortening the total length of the complete zoom lens cannot be obtained.

Also, in the zoom lens of the present embodiment, the shortening of the lens length of a zoom section contributes to a further shortening of the total length of the entire zoom lens. To this purpose, it is preferable to satisfy the following condition:

$$0.2 < |f_2/\sqrt{f_W \cdot f_T}| < 0.3 \tag{7}$$

where $f_2$ is a focal length of the second lens unit, and $f_T$ is a focal length in the telephoto end of the entire zoom lens.

The inequalities of condition (7) are concerned with the refractive power of the second lens unit and have an aim to obtain a predetermined variable magnification ratio advantageously with the aberrations varying to lesser extent with zooming. When the lower limit is exceeded, as this means that the refractive power of the second lens unit is too strong, the compact form of the entire lens system becomes easy to improve, but the Petzval sum increases in the negative direction. So, large field curvature results. Moreover, the variation of aberrations with zooming becomes greater. When the refractive power of the second lens unit is too weak as exceeding the upper limit, the stability of aberrations becomes better throughout the entire variable magnification range, but the required total zooming movement for producing the predetermined variable magnification ratio increases, thereby increasing the total length of the complete zoom lens objectionably.

In the zoom lens of the invention, when the maximum field angle is widened, the diameter of the front lens members is caused to increase. Therefore, the stop may otherwise be located in between the first and second lens units to bring the entrance pupil toward the front however little it may be, thus being made favorable for the diameter of the front lens members. In a case where the zooming range is shifted toward longer focal lengths, on the other hand, the stop may otherwise be located between the third and fourth lens units to reduce the diameter of the stop.

Next, the numerical examples 1 to 4 of the invention are shown. In the data for the numerical examples 1 to 4, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side.

The values of the factors in the above-described conditions (1) and (4) to (7) for the numerical examples 1 to 4 are listed in Table-1.

It is to be noted in the numerical examples 1 to 4 that the last two surfaces R20 and R21 define a face plate or like glass material.

The shape of the aspheric surface is expressed in the coordinates with an X axis in the axial direction and an H axis in the direction perpendicular to the optical axis, the direction in which light advances being taken as positive, by the following equation:

$$X = \frac{(1/R_0)H^2}{1 + \sqrt{1 - (1+K)(H/R_0)^2}} + BH^4 + CH^6 + DH^8 + EH^{10}$$

where $R_0$ is the radius of the osculating sphere, and K, B, C, D and E are the aspheric coefficients.

In the values of the aspheric coefficients, the notation "D–0X" means $10^{-x}$.

Numerical Example 1:

$f = 1-9.99 \quad Fno = 1:1.85-2.95 \quad 2\omega = 60.7°-6.7°$

| | | | |
|---|---|---|---|
| R 1 = 31.0449 | D 1 = 0.1707 | N 1 = 1.92286 | $\upsilon 1$ = 20.9 |
| R 2 = 3.3675 | D 2 = 1.1585 | N 2 = 1.83400 | $\upsilon 2$ = 37.2 |
| R 3 = -13.1435 | D 3 = 0.0366 | | |
| R 4 = 3.0247 | D 4 = 0.5293 | N 3 = 1.83400 | $\upsilon 3$ = 37.2 |
| R 5 = 7.0452 | D 5 = Variable | | |
| R 6 = 5.4044 | D 6 = 0.1220 | N 4 = 1.88300 | $\upsilon 4$ = 40.8 |
| R 7 = 0.9440 | D 7 = 0.4902 | | |
| R 8 = -1.1347 | D 8 = 0.1220 | N 5 = 1.60311 | $\upsilon 5$ = 60.7 |
| R 9 = 1.6113 | D 9 = 0.3976 | N 6 = 1.84666 | $\upsilon 6$ = 23.8 |
| R10 = -25.7337 | D10 = Variable | | |
| R11 = Aspheric | D11 = 0.6390 | N 7 = 1.66910 | $\upsilon 7$ = 55.4 |
| R12 = -14.2968 | D12 = 0.1707 | | |
| R13 = ∞ (Stop) | D13 = 0.2195 | | |
| R14 = 2.1993 | D14 = 0.1220 | N 8 = 1.92286 | $\upsilon 8$ = 20.9 |
| R15 = 1.1447 | D15 = Variable | | |
| R16 = Aspheric | D16 = 0.5341 | N 9 = 1.58313 | $\upsilon 9$ = 59.4 |
| R17 = Aspheric | D17 = Variable | | |
| R18 = 3.8477 | D18 = 0.1220 | N10 = 1.84666 | $\upsilon 10$ = 23.8 |
| R19 = 1.3705 | D19 = 0.4268 | | |
| R20 = ∞ | D20 = 0.8537 | N11 = 1.51633 | $\upsilon 11$ = 64.2 |
| R21 = ∞ | | | |

The Values of the Aspheric Coefficients:

R11: $R_0$ = 1.34447D + 00   K = -7.76778D - 01   B = -9.05299D - 03
      C = -2.93558D - 03

R16: $R_0$ = 1.22405D + 00   K = -5.42795D - 01   B = -7.49320D - 02
      C = -4.34855D - 02

R17: $R_0$ = -2.71745D + 00   K = -5.04954D - 01   B = 3.08511D - 03
      C = -2.14105D - 02

| Variable Separations | Focal Length | | |
|---|---|---|---|
| | 1.00 | 3.40 | 9.99 |
| D5 | 0.17 | 1.66 | 2.53 |
| D10 | 2.46 | 0.97 | 0.10 |
| D15 | 0.67 | 0.30 | 0.68 |
| D17 | 0.17 | 0.55 | 0.17 |

Numerical Example 2:

$f = 1-10 \quad Fno = 1.1.85-2.95 \quad 2\omega = 60.7°-6.7°$

| | | | |
|---|---|---|---|
| R 1 = 19.0827 | D 1 = 0.1707 | N 1 = 1.92307 | $\upsilon 1$ = 18.9 |
| R 2 = 3.3575 | D 2 = 1.1341 | N 2 = 1.87400 | $\upsilon 2$ = 35.3 |
| R 3 = -16.1214 | D 3 = 0.0366 | | |
| R 4 = 2.8929 | D 4 = 0.4878 | N 3 = 1.83400 | $\upsilon 3$ = 37.2 |
| R 5 = 5.8498 | D 5 = Variable | | |
| R 6 = 5.2732 | D 6 = 0.1220 | N 4 = 1.88300 | $\upsilon 4$ = 40.8 |
| R 7 = 0.9313 | D 7 = 0.4839 | | |
| R 8 = -1.1043 | D 8 = 0.1220 | N 5 = 1.65160 | $\upsilon 5$ = 58.5 |
| R 9 = 1.4818 | D 9 = 0.3976 | N 6 = 1.84666 | $\upsilon 6$ = 23.8 |
| R10 = -15.3065 | D10 = Variable | | |
| R11 = Aspheric | D11 = 0.5732 | N 7 = 1.66910 | $\upsilon 7$ = 55.4 |
| R12 = -16.0670 | D12 = 0.1707 | | |
| R13 = ∞ (Stop) | D13 = 0.2195 | | |
| R14 = 2.3854 | D14 = 0.1220 | N 8 = 1.92286 | $\upsilon 8$ = 20.9 |
| R15 = 1.2059 | D15 = Variable | | |
| R16 = Aspheric | D16 = 0.5341 | N 9 = 1.58313 | $\upsilon 9$ = 59.4 |
| R17 = Aspheric | D17 = Variable | | |
| R18 = 3.4768 | D18 = 0.1220 | N10 = 1.84666 | $\upsilon 10$ = 23.8 |
| R19 = 1.4050 | D19 = 0.4268 | | |
| R20 = ∞ | D20 = 0.8537 | N11 = 1.51633 | $\upsilon 11$ = 64.2 |
| R21 = ∞ | | | |

The Values of the Aspheric Coefficients:

R11: $R_0$ = 1.34447D + 00   K = -7.37073D - 01   B = -1.29443D - 02
      C = -3.46986D - 03

R16: $R_0$ = 1.29378D + 00   K = -6.77744D - 01   B = -7.77956D - 02
      C = -3.74328D - 02

R17: $R_0$ = -2.42866D + 00   K = 1.36784D + 00   B = 9.10119D - 03
      C = -9.52233D - 03

-continued

| Variable Separations | Focal Length | | |
|---|---|---|---|
| | 1.00 | 3.43 | 10.00 |
| D5 | 0.16 | 1.56 | 2.38 |
| D10 | 2.32 | 0.92 | 0.10 |
| D15 | 0.71 | 0.31 | 0.74 |
| D17 | 0.17 | 0.57 | 0.17 |

Numerical Example 3:

$f = 1–9.99 \quad Fno = 1:1.85–2.98 \quad 2\omega = 60.7°–6.7°$

| | | | |
|---|---|---|---|
| R 1 = 16.0449 | D 1 = 0.1707 | N 1 = 1.84666 | $\nu1$ = 23.8 |
| R 2 = 3.1438 | D 2 = 1.1220 | N 2 = 1.72000 | $\nu2$ = 50.3 |
| R 3 = −19.2980 | D 3 = 0.0366 | | |
| R 4 = 3.1937 | D 4 = 0.5610 | N 3 = 1.83400 | $\nu3$ = 37.2 |
| R 5 = 10.2575 | D 5 = Variable | | |
| R 6 = 5.1346 | D 6 = 0.1220 | N 4 = 1.88300 | $\nu4$ = 40.8 |
| R 7 = 0.9132 | D 7 = 0.4777 | | |
| R 8 = −1.1182 | D 8 = 0.1220 | N 5 = 1.60311 | $\nu5$ = 60.7 |
| R 9 = 1.5516 | D 9 = 0.3976 | N 6 = 1.84666 | $\nu6$ = 23.8 |
| R10 = −18.2409 | D10 = Variable | | |
| R11 = ∞ (Stop) | D11 = 0.2439 | N 7 = 1.66910 | $\nu7$ = 55.4 |
| R12 = Aspheric | D12 = 0.7976 | | |
| R13 = −62.7628 | D13 = 0.0366 | | |
| R14 = 1.8033 | D14 = 0.1220 | N 8 = 1.92286 | $\nu8$ = 20.9 |
| R15 = 1.0240 | D15 = Variable | | |
| R16 = Aspheric | D16 = 0.5000 | N 9 = 1.58313 | $\nu9$ = 59.4 |
| R17 = −2.7922 | D17 = Variable | | |
| R18 = 10.6906 | D18 = 0.1220 | N10 = 1.84666 | $\nu10$ = 23.8 |
| R19 = 1.9260 | D19 = 0.4268 | | |
| R20 = ∞ | D20 = 0.8537 | N11 = 1.51633 | $\nu11$ = 64.2 |
| R21 = ∞ | | | |

The Values of the Aspheric Coefficients:

R12: $R_0$ = 1.20746D + 00   K = −9.27818D − 01   B = 7.05206D − 03
C = 1.36874D − 03
R16: $R_0$ = 1.52963D + 00   K = −5.42795D − 01   B = −6.03199D − 02
C = 2.30104D − 02

| Variable Separations | Focal Length | | |
|---|---|---|---|
| | 1.00 | 3.30 | 9.99 |
| D5 | 0.17 | 1.66 | 2.53 |
| D10 | 2.55 | 1.07 | 0.20 |
| D15 | 0.74 | 0.39 | 0.74 |
| D17 | 0.21 | 0.57 | 0.21 |

Numerical Example 4:

$f = 1–10 \quad Fno = 1:1.85–2.69 \quad 2\omega = 57.2°–6.2°$

| | | | |
|---|---|---|---|
| R 1 = 26.2606 | D 1 = 0.1591 | N 1 = 1.92286 | $\nu1$ = 20.9 |
| R 2 = 3.2696 | D 2 = 0.9773 | N 2 = 1.83400 | $\nu2$ = 37.2 |
| R 3 = −14.2675 | D 3 = 0.0341 | | |
| R 4 = 2.9937 | D 4 = 0.5227 | N 3 = 1.83400 | $\nu3$ = 37.2 |
| R 5 = 7.3228 | D 5 = Variable | | |
| R 6 = 5.7988 | D 6 = 0.1136 | N 4 = 1.88300 | $\nu4$ = 40.8 |
| R 7 = 0.9158 | D 7 = 0.4730 | | |
| R 8 = −1.1341 | D 8 = 0.1136 | N 5 = 1.60311 | $\nu5$ = 60.7 |
| R 9 = 1.5525 | D 9 = 0.3705 | N 6 = 1.84666 | $\nu6$ = 23.8 |
| R10 = −18.9800 | D10 = Variable | | |
| R11 = Aspheric | D11 = 0.5682 | N 7 = 1.69350 | $\nu7$ = 53.2 |
| R12 = −13.9119 | D12 = 0.1136 | | |
| R13 = 2.2262 | D13 = 0.1136 | | |
| R14 = 1.1650 | D14 = 0.3864 | N 8 = 1.92286 | $\nu8$ = 20.9 |
| R15 = ∞ (Stop) | D15 = Variable | | |
| R16 = Aspheric | D16 = 0.4977 | N 9 = 1.58313 | $\nu9$ = 59.4 |
| R17 = Aspheric | D17 = Variable | | |
| R18 = 4.4435 | D18 = 0.1136 | N10 = 1.84666 | $\nu10$ = 23.8 |
| R19 = 1.2200 | D19 = 0.3977 | | |
| R20 = ∞ | D20 = 0.7955 | N11 = 1.51633 | $\nu11$ = 64.2 |
| R21 = ∞ | | | |

The Values of the Aspheric Coefficients:

R11: $R_0$ = 1.23083D + 00   K = −7.64104D − 01   B = −1.10070D − 02
C = −4.52840D − 03
R16: $R_0$ = 1.21138D + 00   K = −5.05242D − 01   B = −8.20243D − 02
C = −5.11400D − 02

-continued

R17: $R_0 = -2.79728D + 00$  $K = -7.94558D - 01$  $B = 6.04489D - 03$
$C = -1.97443D - 02$

| Variable | Focal Length | | |
|---|---|---|---|
| Separations | 1.00 | 3.16 | 10.00 |
| D5 | 0.14 | 1.60 | 2.47 |
| D10 | 2.42 | 0.95 | 0.09 |
| D15 | 0.77 | 0.46 | 0.77 |
| D17 | 0.16 | 0.46 | 0.16 |

TABLE 1

| Condition | Numerical Example | | | |
|---|---|---|---|---|
| | 1 | 2 | 3 | 4 |
| $f_{3a}/f_3$ | 0.642 | 0.629 | 0.599 | 0.606 |
| $\beta_5$ | 1.553 | 1.530 | 1.582 | 1.701 |
| $f_3/f_w$ | 2.910 | 2.989 | 2.970 | 2.730 |
| $f_4/f_w$ | 1.523 | 1.528 | 1.770 | 1.519 |
| $\|f_2/\sqrt{f_w \cdot f_T}\|$ | 0.262 | 0.247 | 0.262 | 0.259 |

According to the invention, by setting forth the conditions for the refractive powers of the five lens units and for the movements of the second and fourth lens units as described above, and by employing the lens configuration that moves the fourth lens unit when focusing, the zooming range is increased to about 10 with the limitation of the bulk and size of the entire lens system to a minimum, while still permitting a good correction of aberrations throughout the entire zooming range. In addition, a good stability of aberration correction is maintained throughout the entire focusing range. It is thus made possible to achieve a high-range zoom lens of the rear focus type having a good optical performance despite the increase of the relative aperture to as large a value of 1.8 in F-number.

What is claimed is:

1. A zoom lens comprising, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power, wherein said second lens unit and said fourth lens unit are moved to vary magnification and said fourth lens unit is moved to effect focusing, wherein said third lens unit comprises, in order from the object side to the image side, a positive lens and a negative lens having a strong concave surface facing the image side, and wherein said first lens unit, said third lens unit, and said fifth lens unit are stationary during zooming.

2. A zoom lens according to claim 1, satisfying the following condition:

$$0.45 < |f_{3a}/f_3| < 0.75$$

where $f_{3a}$ is a focal length of said positive lens in said third lens unit, and $f_3$ is a focal length of said third lens unit.

* * * * *